(12) United States Patent
Song

(10) Patent No.: US 12,326,651 B2
(45) Date of Patent: Jun. 10, 2025

(54) ELECTRONIC DEVICE AND CAMERA MODULE THEREOF

(71) Applicant: VIVO MOBILE COMMUNICATION CO., LTD., Guangdong (CN)

(72) Inventor: Yalei Song, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 188 days.

(21) Appl. No.: 18/338,500

(22) Filed: Jun. 21, 2023

(65) Prior Publication Data
US 2023/0333453 A1    Oct. 19, 2023

Related U.S. Application Data

(63) Continuation of application No. PCT/CN2021/141889, filed on Dec. 28, 2021.

(30) Foreign Application Priority Data

Dec. 30, 2020  (CN) .......................... 202011622455.9

(51) Int. Cl.
*G03B 17/12*    (2021.01)

(52) U.S. Cl.
CPC ...... *G03B 17/12* (2013.01); *G03B 2205/0023* (2013.01); *G03B 2205/0084* (2013.01)

(58) Field of Classification Search
CPC ............ G03B 17/12; G03B 2205/0023; G03B 2205/0084; G03B 5/00
See application file for complete search history.

(56) References Cited

U.S. PATENT DOCUMENTS

| | | |
|---|---|---|
| 2006/0061660 A1 | 3/2006 | Brackmann |
| 2007/0279497 A1 | 12/2007 | Wada et al. |
| 2008/0080053 A1 | 4/2008 | Homme |
| 2009/0091832 A1 | 4/2009 | Nagai et al. |
| 2013/0294760 A1 | 11/2013 | Honsho et al. |

(Continued)

FOREIGN PATENT DOCUMENTS

| | | |
|---|---|---|
| CN | 101169508 A | 4/2008 |
| CN | 205507322 U | 8/2016 |

(Continued)

*Primary Examiner* — Christopher E Mahoney
(74) *Attorney, Agent, or Firm* — Price Heneveld LLP

(57) ABSTRACT

A camera module includes a lens assembly, a module bracket, a first limit member, a first deformable member, and a second deformable member. The lens assembly is rotatably connected to the module bracket. The first limit member is fastened to the lens assembly or the module bracket. The first and second deformable members are both electro-deformable members. The first and second deformable members are respectively disposed on two opposite sides of the first limit member. When the lens assembly rotates with respect to the module bracket along a first direction, the first deformable member deforms, so that a first rotation angle of the lens assembly is measured. When the lens assembly rotates with respect to the module bracket along a second direction, the second deformable member deforms, so that a second rotation angle of the lens assembly is measured, the second direction being opposite to the first direction.

18 Claims, 3 Drawing Sheets

(56) References Cited

U.S. PATENT DOCUMENTS

| | | |
|---|---|---|
| 2015/0362695 A1 | 12/2015 | Shihoh |
| 2020/0026160 A1 | 1/2020 | Kobayashi et al. |
| 2021/0116787 A1* | 4/2021 | Hwang .................... G03B 3/10 |

FOREIGN PATENT DOCUMENTS

| | | | | |
|---|---|---|---|---|
| CN | 208707750 U | | 4/2019 | |
| CN | 110784650 A | | 2/2020 | |
| CN | 112073600 A | | 12/2020 | |
| CN | 112615999 A | | 4/2021 | |
| CN | 216387702 U | * | 4/2022 | ........... G03B 17/561 |
| JP | 2006300997 A | | 11/2006 | |
| JP | 2008090032 A | | 4/2008 | |
| JP | 2009092819 A | | 4/2009 | |
| JP | 2014142562 A | | 8/2014 | |
| JP | 2014174270 A | | 9/2014 | |
| KR | 20120140482 A | * | 12/2012 | ........... H04N 23/685 |
| KR | 20160009866 A | | 1/2016 | |
| WO | 2013084448 A1 | | 6/2013 | |
| WO | 2014030677 A1 | | 2/2014 | |
| WO | WO-2019109734 A1 | * | 6/2019 | ............. G02B 7/023 |

* cited by examiner

ELECTRONIC DEVICE AND CAMERA MODULE THEREOF

This application is a continuation application of PCT International Application No. PCT/CN2021/141889 filed on Dec. 28, 2021, which claims priority to Chinese Patent Application No. 202011622455.9, filed with the China National Intellectual Property Administration on Dec. 30, 2020 and entitled "ELECTRONIC DEVICE AND CAMERA MODULE THEREOF", which are incorporated herein by reference in their entireties.

TECHNICAL FIELD

This application pertains to the field of communication device technologies, and specifically, to an electronic device and a camera module thereof.

BACKGROUND

With development of technologies, electronic devices such as cell phones play an important role in people's production and life, and the electronic devices are usually equipped with cameras to facilitate shooting by users. When shooting handheld, users are likely to shake, resulting in blurry, ghosting, or other problems of images or videos shot. In the related art, the camera module is typically equipped with an optical anti-shake assembly to improve the definition of the images and videos shot. However, such optical anti-shake assembly can typically correct only image smear caused by camera movement in three dimensions XYZ, but cannot resolve image smearing caused by rotation of the camera around its own optical axis.

SUMMARY

According to a first aspect, an embodiment of this application discloses a camera module including a lens assembly, a module bracket, a first limit member, a first deformable member, and a second deformable member, where the lens assembly is rotatably connected to the module bracket, the first limit member is fastened to the lens assembly or the module bracket, the first deformable member and the second deformable member are both electro-deformable members, the first deformable member is disposed on one side of the first limit member, and the second deformable member is disposed on the other side of the first limit member.

In a case that the lens assembly rotates with respect to the module bracket along a first direction, the first deformable member can deform, so that a first rotation angle of the lens assembly with respect to the module bracket is measured; and in a case that the lens assembly rotates with respect to the module bracket along a second direction, the second deformable member can deform, so that a second rotation angle of the lens assembly with respect to the module bracket is measured, the second direction being opposite to the first direction.

According to a second aspect, an embodiment of this application discloses an electronic device including the foregoing camera module.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application. In the accompanying drawings.

Figure 1:
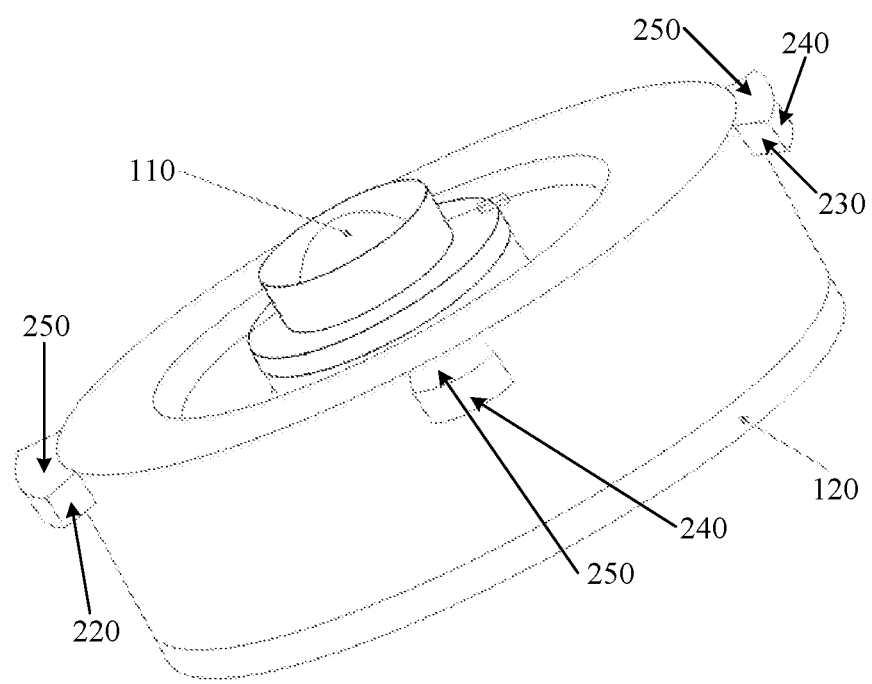
FIG. 1 is a schematic structural diagram of a camera module disclosed according to an embodiment of this application.

Reference numerals in the accompanying drawings are described as follows:

110. lens assembly, 120. photosensitive chip,
210. first limit member, 220. second limit member, 230. third limit member, 240. elastic limit member, 250. limit structure,
300. voltage processing assembly,
410. first deformable member, and 420. second deformable member.

DESCRIPTION OF EMBODIMENTS

To make the objectives, technical solutions, and advantages of this application clearer, the following clearly describes the technical solutions in the embodiments of this application with reference to the accompanying drawings in the embodiments of this application. Obviously, the described embodiments are merely some but not all of the embodiments of this application. All other embodiments obtained by a person of ordinary skill in the art based on the embodiments of this application without creative efforts shall fall within the protection scope of this application.

The technical solutions disclosed in the embodiments of this application are described in detail below with reference to the accompanying drawings.

Figure 2:
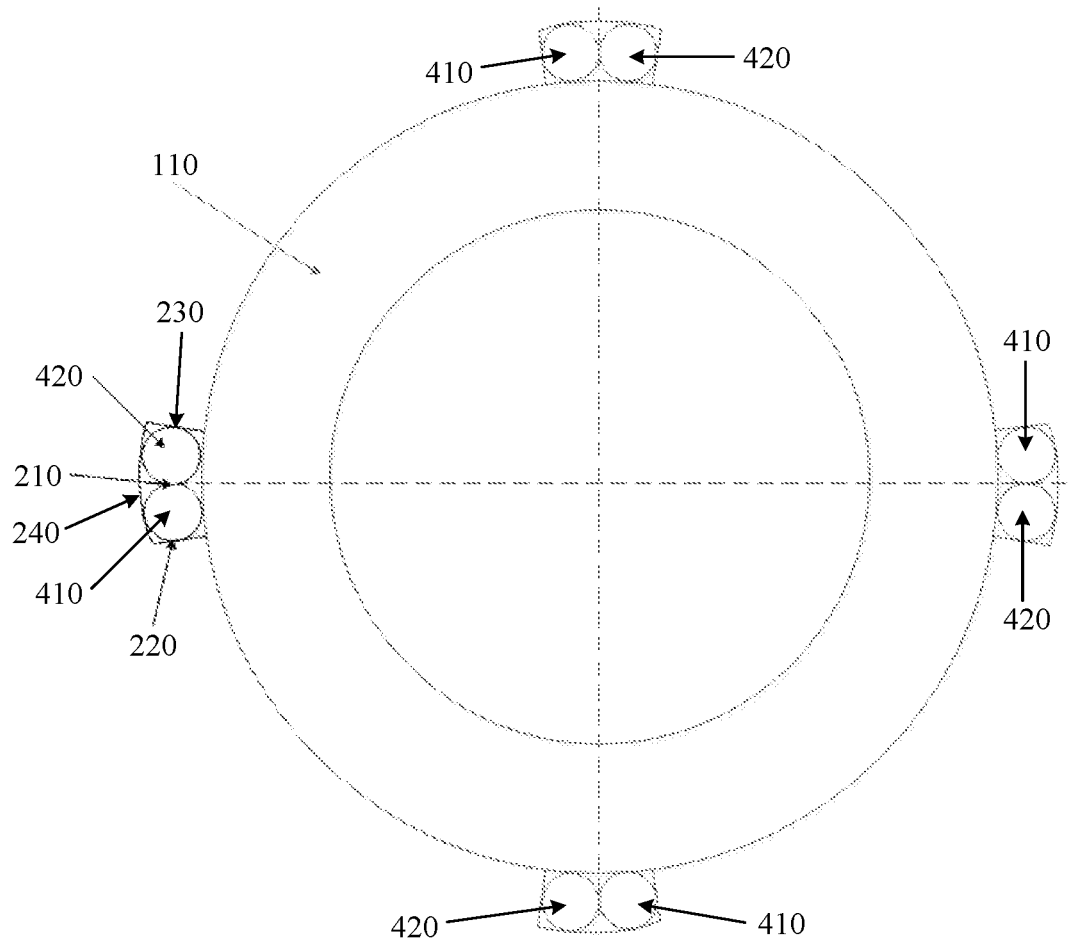
FIG. 2 is a cross-sectional diagram of a partial structure of a camera module disclosed according to an embodiment of this application.

As shown in FIG. 1 and FIG. 2, this application discloses a camera module including a lens assembly 110, a module bracket (not shown in the figure), a first limit member 210, a first deformable member 410, and a second deformable member 420. Certainly, the camera module may further be provided with other components such as a photosensitive chip 120. The photosensitive chip 120 may be disposed on a side of the lens assembly 110 back away from a light incident side.

The lens assembly 110 may include at least one lens, and light outside the camera module is incident to the camera module through the lens assembly 110. The module bracket provides a mounting base for the lens module, and the module bracket can provide some protection for the lens assembly 110. The module bracket may be made of metal or plastic in various shapes and specific structural forms. For example, the module bracket may be of a cylindrical structure. The module bracket surrounds outside the lens assembly 110, with the bottom and at least part of a side of the lens assembly 110 surrounded by the module bracket, thus improving the service life of the camera module.

The lens assembly 110 is rotatably connected to the module bracket. To be specific, a rotation shaft may be disposed between the lens assembly 110 and the module bracket, the rotation shaft extending along the optical axis of the lens assembly 110. This can ensure that the lens assembly 110 can rotate around the optical axis of the lens assembly 110 with respect to the module bracket. Certainly, the lens assembly 110 may be connected to the module bracket through other connection members, thus forming a rotational connection relationship between the lens assembly 110 and the module bracket, which, for brevity, is not listed one by one herein.

The first limit member 210 may be of a plate structure or a block structure. This is not limited in this specification. Certainly, the first limit member 210 should have a structural strength as required, thus ensuring that the first limit member 210 can provide a limiting function for the first deformable member 410 and the second deformable member 420. Specifically, the first limit member 210 may be made of materials such as plastic or metal. In addition, the first limit member 210 may be fastened to the lens assembly 110 or module bracket by means of insertion, bonding, connection by a connection member, and the like.

In order to ensure that the first limit member 210 can provide a normal limit function, the first limit member 210 needs to be disposed between the lens assembly 110 and the module bracket. For example, the first limit member 210 may be fastened to the lens assembly 110, and specifically, the first limit member 210 may be fastened to a side of the lens assembly 110 back away from the light indecent side, that is, between the bottom of the lens assembly 110 and the module bracket. Alternatively, the first limit member 210 may be fastened outside the side wall of the lens assembly 110 and the module bracket surrounds outside the side wall of the lens assembly 110. This can also ensure that the first limit member 210 is located between the lens assembly 110 and the module bracket.

The first deformable member 410 and the second deformable member 420 may be of the same structure or different structures. Optionally, both may be of an elongated or curved structure. The first deformable member 410 and the second deformable member 420 are both electro-deformable members. That is, the first deformable member 410 and the second deformable member 420 are both made of the electro-deformable material. The electro-deformable material may be specifically piezoelectric material, ion exchange polymer metal material, and the like. Such materials can deform when energized. Correspondingly, when the electro-deformable material deforms, a voltage can be generated. In this application, monitoring on the relative rotation between the lens assembly 110 and the module bracket is implemented according to the principle of such material, and the material is used to drive the lens assembly 110 to rotate with respect to the module bracket, thus restoring the lens assembly 110 and the module bracket to an initial state for anti-shaking.

The first deformable member 410 is disposed on one side of the first limit member 210 and the second deformable member 420 is disposed on the other side of the first limit member 210. In other words, the first deformable member 410 and the second deformable member 420 are respectively disposed on opposite sides of the first limit member 210. Thereby, when the lens assembly 110 rotates with respect to the module bracket, the first limit member 210 can rotate with respect to the module bracket (or the lens assembly 110) such that the first limit member 210 can come in contact with and press the first deformable member 410 or the second deformable member 420.

When the lens assembly 110 rotates with respect to the module bracket along a first direction, the first deformable member 410 can deform, so that a first rotation angle of the lens assembly 110 with respect to the module bracket is measured; and when the lens assembly 110 rotates with respect to the module bracket along a second direction, the second deformable member 420 can deform, so that a second rotation angle of the lens assembly 110 with respect to the module bracket is measured. The second direction is opposite to the first direction. Specifically, the first deformable member 410 and the second deformable member 420 can be used for measuring rotation angles of the lens assembly 110 with respect to the module bracket along different directions, and the relative rotation direction between the lens assembly 110 and the module bracket can be determined based on a voltage source.

As described above, the first limit member 210 may be fastened to the lens assembly 110 or the module bracket. For example, the first limit member 210 may be fastened to the lens assembly 110, and optionally, both the first deformable member 410 and the second deformable member 420 may be mounted on the module bracket. In the foregoing embodiment, when the lens assembly 110 and the module bracket rotate with respect to each other along the first direction, the first limit member 210 and the first deformable member 410 can also move with respect to each other. During the continuous rotation of the first limit member 210 and the first deformable member 410 after contact, the first limit member 210 can apply pressure to the first deformable member 410, so that the first deformable member 410 deforms and further generates a voltage. Based on the voltage generated by the first deformable member 410, a deformation amount of the first deformable member 410 can be obtained, so as to further obtain a relative movement angle between the first limit member 210 and the first deformable member 410, that is, the relative rotation angle between the lens assembly 110 and the module bracket along the first direction.

Correspondingly, when the lens assembly 110 and the module bracket rotate with respect to each other along the second direction, the first limit member 210 can come in contact with and press the second deformable member 420. Based on a voltage generated by the second deformable member 420, a relative rotation angle between the lens assembly 110 and the module bracket in the second direction can also be obtained. It should be noted that according to parameters of, for example, shape and material of the first deformable member 410 (or the second deformable member 420) as well as a specific value of the voltage generated by the first deformable member 410 (or the second deformable member 420), the deformation amount of the first deformable member 410 (or the second deformable member 420) can be obtained. Thereby, based on the deformation amount with reference to initial positions of the first limit member 210 and the first deformable member 410 (or the second deformable member 420), the relative rotation angle between the first limit member 210 and the first deformable member 410 (or the second deformable member 420) can be obtained, thus obtaining the relative rotation angle between the lens assembly 110 and the module bracket along the first direction (or the second direction).

In addition, based on the measured relative rotation angle between the lens assembly 110 and the module bracket along the first direction (or the second direction), a preset voltage can be applied to the first deformable member 410 (or the second deformable member 420), such that the first deformable member 410 (or the second deformable member 420) produces a corresponding amount of deformation under the action of the voltage. In this way, the first deformable member 410 deforms itself to drive the first limit member 210, so as to drive the lens assembly 110 and the module bracket to rotate along the second direction (or the first direction), so that the lens assembly 110 and the module bracket are restored to the initial state for anti-shaking.

Figure 3:
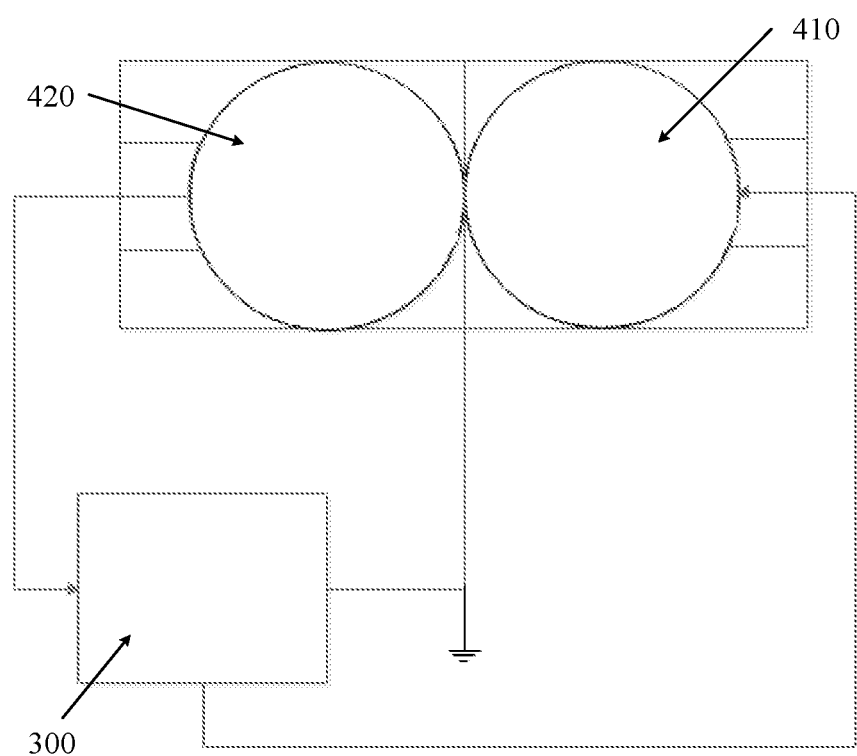
FIG. 3 is a schematic diagram of a circuit connection of a first deformable member and a second deformable member in a camera module disclosed according to an embodiment of this application.

Specifically, the camera module or the electronic device containing such camera module may be provided with a voltage processing assembly 300. As shown in FIG. 3, the voltage processing assembly may be connected to a power supply, and the voltage processing assembly 300 may specifically include a controller, a voltage tester, and a voltage outputter. As shown in FIG. 3, two opposite ends of each of the first deformable member 410 and the second deformable member 420 can be both electrically connected to the voltage processing assembly 300 through connection structures such as wires. When the first deformable member 410 (or the second deformable member 420) is pressed, the voltage generated by the first deformable member 410 can be transmitted to the voltage processing assembly 300 through the wire. The voltage tester can test the generated voltage, so as to determine the deformation amount of the first deformable member 410 (or the second deformable member 420) according to a preset condition. The controller can determine a relative rotation angle between the lens assembly 110 and the module bracket based on the deformation amount, thus controlling, based on the rotation angle, the voltage outputter to output a corresponding voltage. This allows the first deformable member 410 (or the second deformable member 420) to actively deform, driving the lens assembly 110 and the module bracket to rotate with respect to each other for restoring the position.

This application discloses a camera module including a lens assembly 110, a module bracket, a first limit member 210, a first deformable member 410, and a second deformable member 420. The first limit member 210 is relatively fastened to the lens assembly 110 or the module bracket. The first deformable member 410 and the second deformable member 420 are both electro-deformable members and are respectively disposed on two opposite sides of the first limit member 210. When the camera module shakes and rotates around its own optical axis, the lens assembly 110 and the module bracket rotate with respect to each other around the optical axis of the lens assembly 110. This makes the first limit member 210 press the first deformable member 410 (or the second deformable member 420), so as to deform the first deformable member 410 (or the second deformable member 420). Based on the deformation amount of the first deformable member 410 (or the second deformable member 420), a relative rotation angle between the lens assembly 110 and the module bracket can be obtained. Based on the relative rotation angle, a preset voltage can be applied to the first deformable member 410 (or the second deformable member 420), allowing the first deformable member 410 (or the second deformable member 420) to drive the lens assembly 110 and the module bracket to rotate reversely, thus restoring positions of the lens assembly 110 and the module bracket.

In summary, during the operation of the camera module, when the lens assembly 110 rotates with respect to the shot region because the camera module shakes, the camera module can measure the rotation angle and apply a corresponding voltage to drive the lens assembly 110 to move reversely, compensating for the smearing generated due to rotation of the camera module. This keeps a relative position (or a relative angle) of the lens assembly 110 with respect to the shot region unchanged, avoiding image smearing caused by the rotation of the camera module, thus improving the imaging quality of camera.

As described above, in a case that the first limit member 210 is fastened to the lens assembly 110, the first deformable member 410 and the second deformable member 420 can be both fastened to the module bracket, ensuring that the first deformable member 410 and the second deformable member 420 can normally provide functions of angle measurement and driving for position restoration. In order to improve the adjustment accuracy of the camera module, an end of the first deformable member 410 back away from the first limit member 210 can be fastened to the module bracket, and correspondingly, an end of the second deformable member 420 back away from the first limit member 210 can be fastened to the module bracket. In this case, the entire structures of the first deformable member 410 and the second deformable member can deform so as to implement angle measurement, and the entire structures of both can deform when energized to implement position restoration through driving. This can not only maximize the utilization of the first deformable member 410 and the second deformable member 420 but also improve the measurement and adjustment accuracy of the lens assembly 110 to some extent, improving the anti-shaking effect.

In another embodiment of this application, optionally, as shown in FIGS. 1 and 2, the camera module further includes a second limit member 220 and a third limit member 230, the second limit member 220 being disposed on one side of the first limit member 210 and the third limit member 230 being provided on the other side of the first limit member 210. That is, the second limit member 220 and the third limit member 230 are respectively disposed on opposite sides of the first limit member 210. Specifically, the second limit member 220 and the third limit member 230 can be similar in structure to the first limit member 210 and can be of plate or block-shaped structures that can provide a limiting effect. Moreover, the second limit member 220 and the third limit member 230 can alternatively be made of hard materials such as plastic or metal, thus ensuring that the second limit member 220 and the third limit member 230 both can provide a stable and reliable limiting effect.

Of the lens assembly 110 and the module bracket, one is fixedly connected to the first limit member 210 and the other is connected to the second limit member 220 and the third limit member 230, the first deformable member 410 being sandwiched between the second limit member 220 and the first limit member 210, and the second deformable member 420 being sandwiched between the third limit member 230 and the first limit member 210. In other words, as shown in FIG. 2, the second limit member 220, the first deformable member 410, the first limit member 210, the second deformable member 420, and the third limit member 230 are arranged sequentially.

In the above technical solution, when the lens assembly 110 and the module bracket rotate with respect to each other along the first direction, the first limit member 210 and the second limit member 220 can rotate with respect to each other, specifically, getting closer to each other to press the first deformable member 410 located therebetween. Therefore, a relative rotation angle between the lens assembly 110 and the module bracket along the first direction can be obtained based on the deformation amount of the first deformable member 410. Then, based on the measured angle, a preset voltage can be applied to the first deformable member 410, allowing the first deformable member 410 to actively deform, thus driving the first limit member 210 and the second limit member 220 to move with respect to each other. This makes the lens assembly 110 and the module bracket rotate with respect to each other along the second direction, thus restoring the position of the lens assembly 110 for anti-shaking. Certainly, in the above process, the third limit member 230 can also rotate with respect to the first limit member 210. However, the relative rotation process between the two does not involve the angle measurement and driving for position restoration, which, for brevity, is not described herein.

Correspondingly, with the lens assembly 110 and the module bracket rotating with respect to each other along the second direction, the first limit member 210 and the third limit member 230 rotate with respect to each other, specifically, getting closer to each other to press the second deformable member 420 located therebetween. The measurement process and driving process of the second deformable member 420 are similar to those of the first deformable member 410, where the second deformable member 420 can drive the lens assembly 110 and the module bracket to rotate for position restoration along the first direction, thus restoring the lens assembly 110 and the module bracket to their initial positions.

In a case that the positions of the first deformable member 410 and the second deformable member 420 are limited by the second limit member 220 and the third limit member 230, the first deformable member 410 and the second deformable member 420 can be neither connected to the lens assembly 110 and the module bracket, and positions of the first deformable member 410 and the second deformable member 420 are limited only by the first limit member 210, the second limit member 220, and the third limit member 230, thus preventing the adverse impact on the measurement accuracy and deformation accuracy of the first deformable member 410 and the second deformable member 420 in the interaction process of "deformation-electricity generation" due to the limitation of the connection relationship between the two deformable members. This further improves the measurement accuracy of the rotation angle of the lens assembly 110 and can also improve the driving accuracy of the lens assembly 110. In addition, in the above embodiment, the first deformable member 410 and the second deformable member 420 are less difficult to mount.

Optionally, a first spacing between a contact point between the first deformable member 410 and the first limit member 210 and an optical axis of the lens assembly 110 is equal to a second spacing between a contact point between the first deformable member 410 and the second limit member 220 and the optical axis of the lens assembly 110. In other words, the distance from the action point between the first deformable member 410 and the first limit member 210 to the center of the lens assembly 110 is equal to the distance from the action point of the first deformable member 410 and the second limit member 220 to the center of the lens assembly 110, thus allowing for the same interaction effect of the first limit member 210 and the second limit member 220 on the first deformable member 410 when the first deformable member 410 is pressed or energized to actively deform.

Correspondingly, a third spacing from a contact point between the second deformable member 420 and the first limit member 210 to the optical axis of the lens assembly 110 is equal to a fourth spacing from a contact point between the second deformable member 420 and the third limit member 230 to the optical axis of the lens assembly 110, allowing for the substantially same interaction effect of the first limit member 210 and the third limit member 230 on the second deformable member 420.

Specifically, as described above, the first deformable member 410 may be a bar-shaped structure member or the like. The extension direction of the first deformable member 410 is perpendicular to a connection line between the midpoint of the first deformable member 410 and the optical axis of the lens assembly 110, such that the spacings between opposite ends of the first deformable member 410 and the optical axis of the lens assembly 110 are equal or substantially equal.

Both the first limit member 210 and the second limit member 220 may be in point or surface contact with the first deformable member 410. In the case of both the first limit member 210 and the second limit member 220 being in surface contact with the first deformable member 410, the above contact points may be contact points corresponding to each other. For example, the contact points corresponding to each other can include a first contact point between the center of one end face of the first deformable member 410 and the first limit member 210 and a second contact point between the center of the other end face of the first deformable member 410 and the second limit member 220. Because the structure of the second deformable member 420 is similar to that of the first deformable member 410, the two can be provided in the substantially same way and details are not repeated herein.

Further, the first limit member 210 and the second limit member 220 both have a limit plane. Specifically, the first limit member 210 and the second limit member 220 both cooperate with the first deformable member 410 through the plane structure. This can improve the limiting effect on the first deformable member 410 to some extent. Optionally, the intersection line of the two limit planes is the straight line on which the optical axis of the lens assembly 110 is located. In other words, the limit plane of the first limit member 210 and the limit plane of the second limit member 220 intersect and both cross the optical axis of the lens assembly 110 or the straight line on which the optical axis of the lens assembly 110 is located is located on the limit planes of both the first limit member 210 and the second limit member 220.

When the first deformable member 410 is energized, the first deformable member 410 deforms and applies a first driving force and a second driving force to the first limit member 210 and the second limit member 220 respectively. In the foregoing technical solution, the direction of the first driving force is basically perpendicular to the limit plane of the first limit member 210, and the direction of the second driving force is substantially perpendicular to the limit plane of the second limit member 220, such that the first driving force and the second driving force do not have other action effects, but only act on the first limit member 210 and the second limit member 220, thus allowing for relative rotation between the first limit member 210 and the second limit member 220. This can reduce the waste of driving force, improve the driving efficiency, and reduce power consumption.

In addition, in the case of using the foregoing technical solution, the whole force of the relative rotation between the first limit member 210 and the second limit member 220 can act substantially on the first deformable member 410, compressing and deforming the first deformable member 410, allowing for a more accurate value of the measured rotation angle between the lens assembly 110 and the module bracket through the first deformable member 410.

Correspondingly, the first limit member 210 and the third limit member 230 both having a limit plane and the intersection line of the two limit planes being the straight line on which the optical axis of the lens assembly 110 is located can improve the driving efficiency of the second deformable member 420, reduce power consumption, and improve the measurement accuracy of the relative rotation angle between the lens assembly 110 and the module bracket through the second deformable member 420.

Optionally, both the first deformable member 410 and the second deformable member 420 can be curved structure members, further enhancing the action effects of the two deformable members on the first limit member 210. In another embodiment of this application, both the first deformable member 410 and the second deformable member 420 can be spherical-structured components. This can enable the first deformable member 410 and the second deformable member 420 to meet the requirements of the above embodiment and reduce the processing and mounting difficulties of the first deformable member 410 and the second deformable member 420.

As described above, the first limit member 210 can be fastened to the lens module or the module bracket. Optionally, the first limit member 210 is fixed to the lens assembly 110, reducing parts attached to the lens assembly 110 and the rotation difficulty of the lens assembly 110.

As described above, the first limit member 210 may be provided at the bottom of the lens assembly 110, and in another embodiment of this application, as shown in FIG. 2, the first limit member 210 is provided outside the side wall of the lens assembly 110. In this case, the lens assembly 110 rotates a little, allowing the first limit member 210 to move with the lens assembly 110, thus implementing higher sensing sensitivity of the first limit member 210 and improving the anti-shake performance of the camera module. The side wall of the lens assembly 110 surrounds the optical axis of the lens assembly 110, and correspondingly, the bottom of the lens assembly 110 is a structure perpendicular to the optical axis of the lens assembly 110.

Based on the foregoing embodiment, in the case that the camera module is provided with the second limit member 220 and the third limit member 230, the second limit member 220 and the third limit member 230 may also be provided outside the side wall of the lens assembly 110, and in the case that the first limit member 210 is connected to the lens assembly 110, the second limit member 220 and the third limit member 230 can both be fixedly connected to the module bracket.

In order to ensure that the first deformable member 410 does not move between the first limit member 210 and the second limit member 220 in a direction away from the lens assembly 110, that is, to prevent the first deformable member 410 from moving away from the lens assembly 110 along the axial direction of the lens assembly 110, a side of the first limit member 210 and a side the second limit member 220 that are back away from the lens assembly 110 can approach each other, thereby holding the first deformable member 410 among the first limit member 210, the second limit member 220, and the lens assembly 110.

However, as described above, in order to improve the performance of the camera module, the limit planes of the first limit member 210 and the second limit member 220 can cross the straight line on which the optical axis of the lens assembly 110 is located. In such case, a spacing between parts of the first limit member 210 and the second limit member 220 closer to the lens assembly 110 is smaller, and a spacing between parts of the two limit members further away from the lens assembly 110 is larger, allowing the first limit member 210 and the second limit member 220 to form a flaring-structured member. This makes it impossible for the first limit member 210 and the second limit member 220 to provide a limiting function for the first deformable member 410. Accordingly, the second deformable member 420 also has the problem that its position cannot be limited by the first limit member 210 and the third limit member 230.

Based on this, optionally, as shown in FIGS. 1 and 2, the camera module may further include an elastic limit member 240. The elastic limit member 240 is connected to a side of the second limit member 220 and a side of the third limit member 230 that are back away from the lens assembly 110, and the first deformable member 410 and the second deformable member 420 are both limited between the elastic limit member 240 and a side wall of the lens assembly 110. In this case, the positions of the first deformable member 410 and the second deformable member 420 can be limited using the elastic limit member 240, preventing the first deformable member 410 and the second deformable member 420 from moving in a direction away from the lens assembly 110, thus being able to provide normal functions of angle measurement and driving for position restoration.

The elastic limit member 240 may be specifically made of a material with certain elasticity such that when the first deformable member 410 is pressed by the first limit member 210 and the second limit member 220, the elastic limit member 240 deforms elastically, providing a space for the first deformable member 410, thus ensuring that the first deformable member 410 can deform normally. Correspondingly, for the deformation of the second deformable member 420 caused by pressure, the second deformable member 420 can also press the elastic limit member 240 so that the second deformable member 420 can deform normally.

Certainly, in order to ensure that both the first deformable member 410 and the second deformable member 420 can stably fit the lens assembly 110, in addition to the provision of the elastic limit member 240 on the side of the first limit member 210 back away from the lens assembly 110, as shown in FIGS. 1 and 2, limit structures 250 can be also respectively provided on the other two sides of the first limit member 210. This allows the first deformable member 410 and the second deformable member 420 to be encapsulated and limited among the second limit member 220, the elastic limit member 240, the third limit member 230, the lens assembly 110, and the two limit structures 250.

Optionally, the first limit member 210 is provided in plurality, the first deformable member 410 is provided on one side of each first limit member 210 and the second deformable member 420 is provided on the other side. In this case, when the lens assembly 110 rotates with respect to the module bracket along the first direction, the rotation angle can be measured using the plurality of first deformable members 410 together, thus further improving the angle measurement accuracy. In addition, the lens assembly 110 can be driven by the plurality of first deformable members 410 together to rotate with respect to the module bracket, improving the driving reliability. Correspondingly, when the lens assembly 110 rotates with respect to the module bracket along the second direction, the rotation angle can be measured using a plurality of second deformable members 420 together, thus improving the measurement and adjustment accuracy.

In a case that the first limit member 210, the first deformable member 410, and the second deformable member 420 are all provided in plurality, the second limit member 220 and the third limit member 230 can be also provided in plurality, and the plurality of second limit members 220 and the plurality of third limit members 230 fit the plurality of first limit members 210 in a one-to-one correspondence, further improving the adjustment accuracy of the camera module.

Optionally, the plurality of first limit members 210 are equally spaced apart around the optical axis of the lens assembly 110. In this case, the various parts of the lens assembly 110 are subjected to a uniform driving force, preventing the lens assembly 110 from being stuck due to force deflection during the rotation of the lens assembly 110 with respect to the module bracket, thus improving the reliability of the camera module. Specifically, three, four, or more first limit members 210 may be provided, thus ensuring a reliable fitting relationship between the lens assembly 110 and the module bracket.

Based on the camera module disclosed in any one of the above embodiments, an embodiment of this application further provides an electronic device. The electronic device includes the camera module provided in any one of the above embodiments. Certainly, the electronic device further includes other devices such as a display module, a shell, and a battery, which, for brevity, is not described therein one by one.

The electronic device disclosed in the embodiment of this application may be a smart phone, a tablet computer, an e-book reader, or a wearable device. Certainly, the electronic device may alternatively be another device, which is not limited in the embodiments of this application.

The foregoing embodiments of this application focus on the differences between the embodiments. As long as the different features of improvement in the embodiments are not contradictory, they can be combined to form a more preferred embodiment. For brevity, details are not repeated here.

The foregoing descriptions are merely embodiments of this application and are not intended to limit this application. For persons skilled in the art, this application may have various changes and variations. Any modification, equivalent replacement, improvement, or the like made without departing from the spirit and principle of this application shall fall within the scope of claims of this application.

What is claimed is:

1. A camera module, comprising a lens assembly, a module bracket, a first limit member, a first deformable member, and a second deformable member, wherein the lens assembly is rotatably connected to the module bracket, the first limit member is fastened to the lens assembly or the module bracket, the first deformable member and the second deformable member are both electro-deformable members, the first deformable member is disposed on one side of the first limit member, and the second deformable member is disposed on an other side of the first limit member; and in a case that the lens assembly rotates with respect to the module bracket along a first direction, the first deformable member deforms, so that a first rotation angle of the lens assembly with respect to the module bracket is measured; and in a case that the lens assembly rotates with respect to the module bracket along a second direction, the second deformable member deforms, so that a second rotation angle of the lens assembly with respect to the module bracket is measured, the second direction being opposite to the first direction.

2. The camera module according to claim 1, wherein the camera module further comprises a second limit member and a third limit member, the second limit member is disposed on one side of the first limit member, the third limit member is disposed on the other side of the first limit member, one of the lens assembly and the module bracket is fixedly connected to the first limit member, the other of the lens assembly and the module bracket is fixedly connected to both the second limit member and the third limit member, the first deformable member is sandwiched between the second limit member and the first limit member, and the second deformable member is sandwiched between the third limit member and the first limit member.

3. The camera module according to claim 2, wherein a first spacing from a contact point between the first deformable member and the first limit member to an optical axis of the lens assembly is equal to a second spacing from a contact point between the first deformable member and the second limit member to the optical axis of the lens assembly; and/or
a third spacing from a contact point between the second deformable member and the first limit member to the optical axis of the lens assembly is equal to a fourth spacing from a contact point between the second deformable member and the third limit member to the optical axis of the lens assembly.

4. The camera module according to claim 3, wherein the first limit member and the second limit member both have a limit plane, and an intersection line between the two limit planes is a straight line on which the optical axis of the lens assembly is located; and/or
the first limit member and the third limit member both have a limit plane, and an intersection line between the two limit planes is a straight line on which the optical axis of the lens assembly is located.

5. The camera module according to claim 4, wherein the first deformable member and/or the second deformable member is a spherical-structured component.

6. The camera module according to claim 3, wherein the first limit member is disposed on a side wall of the lens assembly and the side wall surrounds the optical axis of the lens assembly.

7. The camera module according to claim 6, wherein the camera module further comprises an elastic limit member, the elastic limit member is connected to a side of the second limit member and a side of the third limit member that are back away from the lens assembly, and the first deformable member and the second deformable member are both disposed between the elastic limit member and a side wall of the lens assembly.

8. The camera module according to claim 1, wherein the first limit member is provided in plurality, and the first deformable member is provided on one side of each first limit member and the second deformable member is provided on the other side.

9. The camera module according to claim 8, wherein the plurality of first limit members are spaced apart equally around the optical axis of the lens assembly.

10. An electronic device, comprising: a camera module; wherein the camera module comprises a lens assembly, a module bracket, a first limit member, a first deformable member, and a second deformable member, wherein the lens assembly is rotatably connected to the module bracket, the first limit member is fastened to the lens assembly or the module bracket, the first deformable member and the second deformable member are both electro-deformable members, the first deformable member is disposed on one side of the first limit member, and the second deformable member is disposed on an other side of the first limit member; and
in a case that the lens assembly rotates with respect to the module bracket along a first direction, the first deformable member deforms, so that a first rotation angle of the lens assembly with respect to the module bracket is measured; and in a case that the lens assembly rotates with respect to the module bracket along a second direction, the second deformable member deforms, so that a second rotation angle of the lens assembly with respect to the module bracket is measured, the second direction being opposite to the first direction.

11. The electronic device according to claim 10, wherein the camera module further comprises a second limit member and a third limit member, the second limit member is disposed on one side of the first limit member, the third limit member is disposed on the other side of the first limit member, one of the lens assembly and the module bracket is fixedly connected to the first limit member, the other of the lens assembly and the module bracket is fixedly connected to both the second limit member and the third limit member, the first deformable member is sandwiched between the second limit member and the first limit member, and the second deformable member is sandwiched between the third limit member and the first limit member.

12. The electronic device according to claim 11, wherein a first spacing from a contact point between the first deformable member and the first limit member to an optical axis of the lens assembly is equal to a second spacing from a contact point between the first deformable member and the second limit member to the optical axis of the lens assembly; and/or
a third spacing from a contact point between the second deformable member and the first limit member to the optical axis of the lens assembly is equal to a fourth spacing from a contact point between the second deformable member and the third limit member to the optical axis of the lens assembly.

13. The electronic device according to claim 12, wherein the first limit member and the second limit member both have a limit plane, and an intersection line between the two limit planes is a straight line on which the optical axis of the lens assembly is located; and/or
the first limit member and the third limit member both have a limit plane, and an intersection line between the two limit planes is a straight line on which the optical axis of the lens assembly is located.

14. The electronic device according to claim 13, wherein the first deformable member and/or the second deformable member is a spherical-structured component.

15. The electronic device according to claim 12, wherein the first limit member is disposed on a side wall of the lens assembly and the side wall surrounds the optical axis of the lens assembly.

16. The electronic device according to claim 15, wherein the camera module further comprises an elastic limit member, the elastic limit member is connected to a side of the second limit member and a side of the third limit member that are back away from the lens assembly, and the first deformable member and the second deformable member are both disposed between the elastic limit member and a side wall of the lens assembly.

17. The electronic device according to claim 10, wherein the first limit member is provided in plurality, and the first deformable member is provided on one side of each first limit member and the second deformable member is provided on the other side.

18. The electronic device according to claim 17, wherein the plurality of first limit members are spaced apart equally around the optical axis of the lens assembly.

* * * * *